United States Patent
Lei et al.

(10) Patent No.: US 10,638,447 B2
(45) Date of Patent: Apr. 28, 2020

(54) CONTROL PLANE SIGNALING PROCESSING METHOD AND SYSTEM IN V2V TRANSMISSION MECHANISM

(71) Applicant: Yulong Computer Telecommunication Scientific (Shenzhen) Co., Ltd., Shenzhen (CN)

(72) Inventors: Yixue Lei, Shenzhen (CN); Yunfei Zhang, Shenzhen (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/070,268

(22) PCT Filed: Jul. 30, 2016

(86) PCT No.: PCT/CN2016/092467
§ 371 (c)(1),
(2) Date: Jul. 13, 2018

(87) PCT Pub. No.: WO2017/121096
PCT Pub. Date: Jul. 20, 2017

(65) Prior Publication Data
US 2019/0014444 A1    Jan. 10, 2019

(30) Foreign Application Priority Data
Jan. 15, 2016    (CN) .......................... 2016 1 0027852

(51) Int. Cl.
*H04W 4/02*    (2018.01)
*H04W 64/00*    (2009.01)
(Continued)

(52) U.S. Cl.
CPC ......... *H04W 64/006* (2013.01); *H04W 4/027* (2013.01); *H04W 4/029* (2018.02);
(Continued)

(58) Field of Classification Search
CPC ..... H04W 4/029; H04W 24/10; H04W 4/027; H04W 4/40; H04W 4/20; H04W 4/02; H04W 52/0209; Y02D 70/00
See application file for complete search history.

(56) References Cited

U.S. PATENT DOCUMENTS

2014/0242965 A1*  8/2014  Lee ................... H04W 52/0216
                                                    455/418
2017/0367005 A1* 12/2017  Shi .................... H04W 28/0289

FOREIGN PATENT DOCUMENTS

CN          102405656 A       4/2012
CN          102421118 A       4/2012
(Continued)

OTHER PUBLICATIONS

International Search Report for Interantional Application No. PCT/CN2016/092467, dated Oct. 26, 2016.
(Continued)

*Primary Examiner* — Chuong A Ngo
(74) *Attorney, Agent, or Firm* — Wolf, Greenfield & Sacks, P.C.

(57) ABSTRACT

A method and system for processing control plane signaling in a Vehicle to Vehicle (V2V) transmission mechanism are provided. A base station configures a trigger condition for a user equipment (UE) based on resource situations. The UE receives the trigger condition, and reports current location information to the base station based on the trigger condition when the trigger condition is satisfied. The base station appropriately reduces control plane signaling overheads and the power consumption of the UE on the premise of ensuring the location accuracy of the UE by controlling the number of reports and reporting frequency of the UE based on the trigger condition, thereby achieving the objective of improv- (Continued)

ing the overall utilization of radio resources and reducing the power consumption of the UE.

17 Claims, 5 Drawing Sheets

(51) Int. Cl.
  *H04W 4/40* (2018.01)
  *H04W 4/20* (2018.01)
  *H04W 4/029* (2018.01)
  *H04W 24/10* (2009.01)
  *H04W 52/02* (2009.01)

(52) U.S. Cl.
  CPC ............... *H04W 4/20* (2013.01); *H04W 4/40* (2018.02); *H04W 24/10* (2013.01); *H04W 52/0209* (2013.01); *Y02D 70/00* (2018.01)

(56) References Cited

FOREIGN PATENT DOCUMENTS

| | | |
|---|---|---|
| CN | 103155620 A | 6/2013 |
| CN | 105611499 A | 5/2016 |
| WO | WO 2015/113597 A1 | 8/2015 |

OTHER PUBLICATIONS

Written Opinion for Interantional Application No. PCT/CN2016/092467, dated Oct. 26, 2016.

* cited by examiner

CONTROL PLANE SIGNALING PROCESSING METHOD AND SYSTEM IN V2V TRANSMISSION MECHANISM

CROSS-REFERENCES TO RELATED APPLICATIONS

This application is a national stage filing under 35 U.S.C. § 371 of international application number PCT/CN2016/092467, filed Jul. 30, 2016, entitled "CONTROL PLANE SIGNALING PROCESSING METHOD AND SYSTEM IN V2V TRANSMISSION MECHANISM", which claims priority to Chinese Patent Application No. 201610027852.9, titled "Method and System For Processing Control Plane Signaling Processing In V2V Transmission Mechanism" and filed to the State Intellectual Property Office on Jan. 15, 2016, the entire contents of which are incorporated herein by reference.

TECHNICAL FIELD

The present disclosure relates to the field of communication technologies, for example, to a control plane signaling processing method and system in a Vehicle to Vehicle (V2V) transmission mechanism.

BACKGROUND

To achieve information exchange between vehicles and the outside world, a communication project of Vehicle to X (V2X) focused on studying transmission schemes of vehicle data based on the 3rd Generation Partnership Project (3GPP) communication protocol is approved to be established in 3GPP RAN#68. This project includes a Vehicle-to-Vehicle (V2V) communication project, a Vehicle to Pedestrian (V2P) communication project, and a Vehicle to Infrastructure (V2I) communication project, etc. V2V may be implemented through a Uu interface and a PC5 interface. A V2V communication mechanism based on PC5/D2D, the V2V may not occupy macro network radio bearer resources in a user plane data transmission process, and may naturally achieve spatial division multiplexing. Therefore, the V2V communication mechanism based on PC5/D2D is regarded as an LTE-based V2V mainstream technology.

In the 3GPP TSG RAN1 #83 discussion, it was mentioned that a base station can schedule a sidelink (SL) transmission based on a current location of a user equipment (UE) such as a vehicle. In the process of scheduling by the base station based on the location of the user equipment, the UE continuously triggers a radio resource control (RRC) report message in order to let the base station learn the current location of the UE.

However, excessive occupancy of signaling radio bearer (SRB) resources may be caused if the UE frequently reports its current location to the base station through the RRC messages. For example, excessive occupancy of resources will become more and more apparent as the number of UEs increases and the reporting frequency increases. In fact, excessive macro network resources also may be occupied, which increases the signaling overhead of the entire control plane, and causes a decrease in the overall utilization of the radio resources. Furthermore, the increase of reported messages also may increase power consumption of the UE. For example, in a scenario where a user's hand-held equipment supports the V2X, the increase in energy consumption of the UE also is a problem urgently to be solved.

SUMMARY

Based on the above problems, the present disclosure provides a method and system for processing control plane signaling in a Vehicle to Vehicle (V2V) transmission mechanism, which can solve the problem of increasing control plane signaling overheads and an effect on energy consumption of a user equipment (UE) caused by frequently reporting current location through the RRC messages to a base station, thereby achieving the objective of improving the overall utilization of radio resources and reducing power consumption of the UE.

In view of this, the present disclosure provides a method for processing control plane signaling in a Vehicle to Vehicle (V2V) transmission mechanism. The method includes:

configuring, by a base station and based on a resource situation, a trigger condition for a UE; and receiving, by the UE, the trigger condition, and reporting, by the UE, current location information to the base station based on the trigger condition when the trigger condition is satisfied.

In this technical solution, alternatively, the method further includes:

obtaining, by the base station when a cell covered by the base station is a macro cell, a range of the macro cell currently covered;

estimating a granularity for grid division by the base station based on a road topology and a UE density within the range of the macro cell; and dividing, by the base station based on the granularity, the macro cell into a plurality of grids; or dividing the macro cell into a plurality of grids based on the granularity, respectively numbering the plurality of grids, and taking numbers of the plurality of grids as grid indexes.

The trigger condition configured by the base station for the UE based on the resource situation is triggering a location report when the UE moves from one grid to another grid.

In this technical solution, alternatively, the method further includes:

downloading, by the UE, grid configuration information of the macro cell after the UE enters the macro cell and gets into a connected state.

In this technical solution, alternatively, the reporting current location information to the base station based on the trigger condition when the trigger condition is satisfied includes:

positioning in real time by the UE to determine whether the UE moves from one grid to another grid; when it is determined that the UE moves from one grid to another grid, determining that the trigger condition is satisfied; and reporting the current location information to the base station via a radio resource control (RRC) layer by the UE when the grid configuration information does not include the grid index, or reporting the grid index of the grid where the UE currently is located to the base station via a media access control (MAC) layer by the UE when the grid configuration information includes the grid index.

In this technical solution, alternatively, the method further includes:

triggering a location report based on a preset maximum report frequency or a preset minimum report frequency when a cell covered by the base station is a macro cell and the macro cell is not divided into grids, wherein the trigger condition configured by the base station for the UE based on the resource situation is that a velocity of the UE changes.

In this technical solution, alternatively, the reporting the current location information to the base station by the UE based on the trigger condition when the trigger condition is satisfied includes:

determining, by the UE in real time, the velocity of the UE;

determining that the trigger condition is satisfied and reporting the current location information to the base station at the preset maximum report frequency via a radio resource control (RRC) layer upon determining that the velocity of the UE is adjusted to be a high velocity and a displacement state changes greatly; and determining that the trigger condition is satisfied and reporting the current location information to the base station at the preset minimum report frequency via the RRC layer upon determining that the velocity is adjusted to be a low velocity and the displacement state changes slightly.

In this technical solution, alternatively, the method further includes:

when a cell covered by the base station is a macro cell and the macro cell is not divided into grids, the trigger condition configured by the base station for the UE based on the resource situation is triggering a location report when a differential between a location previously reported by the UE and a current location is greater than a preset threshold.

In this technical solution, alternatively, the reporting the current location information to the base station by the UE based on the trigger condition when the trigger condition is satisfied includes:

when the UE determines, based on a hysteresis mechanism and within a preset time, that the differential between the location previously reported and the current location is greater than the preset threshold, determining that the trigger condition is satisfied and reporting the current location information to the base station via a RRC layer.

In this technical solution, alternatively, the method further includes:

when a cell covered by the base station is a small cell, directly receiving, by the UE, a scheduling of the base station, or when the UE enters a region controlled by a road side unit (RSU), directly receiving, by the UE, a scheduling of the RSU.

According to a technical solution in a second aspect of the present disclosure, there is further provided a system for processing control plane signaling in a Vehicle to Vehicle (V2V) transmission mechanism. The system includes a base station and a user equipment (UE).

The base station is configured to configure a trigger condition for the UE based on a resource situation.

The UE is configured to receive the trigger condition, and report current location information to the base station based on the trigger condition when the trigger condition is satisfied.

In this technical solution, alternatively, the base station includes:

a first obtaining module, configured to, when a cell covered by the base station is a macro cell, obtain a range of the macro cell currently covered;

an estimating module, configured to estimate a granularity for grid division based on a road topology and a UE density within the range of macro cell;

a dividing module, configured to divide the macro cell into a plurality of grids based on the granularity, or divide the macro cell into a plurality of grids based on the granularity, respectively number the plurality of grids, and take numbers of the plurality of grids as grid indexes; and a first configuring module, configured to configure, for the UE, the trigger condition of triggering a location report when the UE moves from one grid to another grid.

The UE includes:

a downloading module, configured to download grid information of the macro cell after the UE enters the macro cell and gets into a connected state; and a first reporting module, configured to position in real time, determine that the trigger condition is satisfied when determining that the UE moves from one grid to another grid, and report the current location information to the base station via a radio resource control (RRC) layer when the grid configuration information does not include the grid index, or report the grid index of the grid where the UE currently is located to the base station via a media access control (MAC) layer when the grid configuration information includes the grid index.

In this technical solution, alternatively, the base station includes:

a second configuring module, configured to configure, for the UE when a cell covered by the base station is a macro cell and the macro cell is not divided into grids, the trigger condition of triggering a location report based on a preset maximum report frequency or a preset minimum report frequency when a velocity of the UE changes.

The UE includes:

a velocity determining module, configured to determine a velocity of the UE in real time; and a second reporting module, configured to report the current location information to the base station at the preset maximum report frequency via a RRC layer after determining that the trigger condition is satisfied when the velocity is adjusted to be a high velocity and a displacement state changes greatly, or report the current location information to the base station at the preset minimum report frequency via the RRC layer after determining that the trigger condition is satisfied when the velocity is adjusted to be a low velocity and the displacement state changes slightly.

In this technical solution, alternatively, the base station includes:

a third configuring module, configured to configure, for the UE when a cell covered by the base station is a macro cell and the macro cell is not divided into grids, the trigger condition of triggering a location report when a differential between a location previously reported by the UE and a current location is greater than a preset threshold.

The UE includes:

a third reporting module, configured to report the current location information to the base station via a radio resource control (RRC) layer after determining that the trigger condition is satisfied when the UE determines, based on a hysteresis mechanism within preset time, that the differential between the location previously reported and the current location is greater than the preset threshold.

According to a technical solution in a third aspect of the present disclosure, an embodiment of the present disclosure further provides a non-transitory computer readable storage medium, which is arranged at a UE and stores computer-executable instructions. The computer-executable instructions may execute the method for processing control plane signaling in a V2V transmission mechanism according to any one of the above embodiments.

According to a technical solution in a fourth aspect of the present disclosure, an embodiment of the present disclosure further provides a non-transitory computer readable storage medium, which is arranged at a base station and stores computer-executable instructions. The computer-executable instructions may execute the method for processing control plane signaling in a V2V transmission mechanism according to any one of the above embodiments.

According to the technical solution for processing control plane signaling disclosed by the embodiments of the present disclosure, the UE receives the trigger condition configured by the base station based on the resource situation, and reports the current location information to the base station based on the trigger condition when the trigger condition is satisfied. The current location information is reported to the base station based on the trigger condition configured by the base station to the UE based on the resource situation of the base station when the trigger condition is satisfied when the UE is running. The base station configures, for the UE, the trigger condition of reporting the current location information based on the resource situation of the base station. The base station appropriately reduces control plane signaling overheads and power consumption of the UE while ensuring the location accuracy by controlling the number of reports and reporting frequency of the UE based on the trigger condition, thereby achieving the objective of improving the overall utilization of radio resources and reducing power consumption of the UE.

DETAILED DESCRIPTION

To more clearly understand the objectives, features and advantages of the present disclosure, related description of the present disclosure is made below with reference to the accompanying drawings and embodiments. It is to be noted that the embodiments of the present disclosure and the features in the embodiments may be combined with each other on a non-conflict basis.

Many details are set forth in the following description to fully understand the present disclosure. However, the present disclosure also may be implemented by using other manners other than the embodiments described herein. Therefore, the protection scope of the present disclosure is not limited by the embodiments disclosed in the following.

Based on the 3GPP TSG RAN2 standard, the present disclosure saves control plane signaling in a high-capacity V2V transmission, namely, solves the problem of signaling overhead caused by reporting location information by the UE.

Embodiment I

Figure 1:
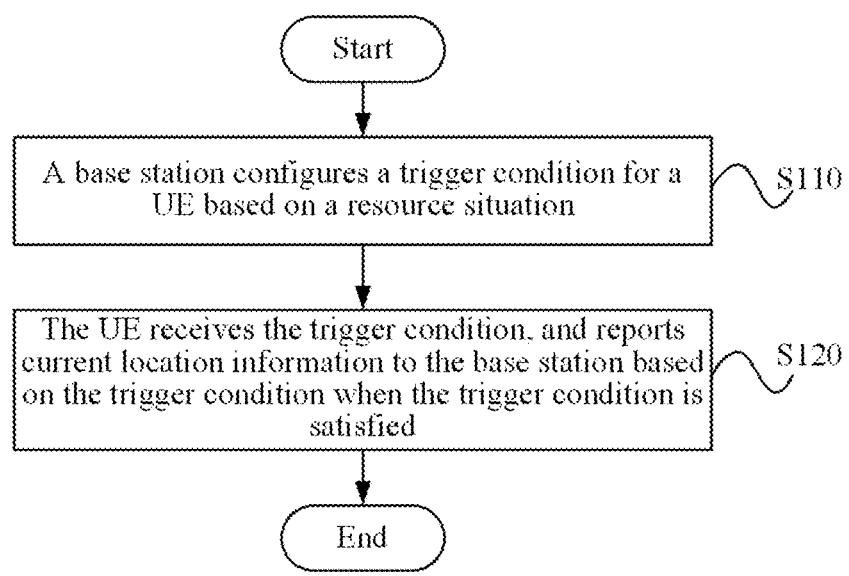
FIG. 1 illustrates a schematic flowchart of a method for processing control plane signaling in a Vehicle to Vehicle (V2V) transmission mechanism according to Embodiment I of the present disclosure.

FIG. 1 illustrates a schematic flowchart of a method for processing control plane signaling in a Vehicle to Vehicle (V2V) transmission mechanism according to Embodiment I of the present disclosure. The method includes the following steps.

In S110, a base station configures a trigger condition for a user equipment (UE) based on a resource situation.

In S120, the UE receives the trigger condition, and reports current location information to the base station based on the trigger condition when the trigger condition is satisfied.

According to the technical solution of processing control plane signaling disclosed by this embodiment of the present disclosure, the UE receives the trigger condition configured by the base station based on the resource situation, and reports the current location information to the base station based on the trigger condition when the trigger condition is satisfied.

The current location information of the UE is reported to the base station based on the trigger condition, which is configured by the base station to the UE based on the resource situation of the base station, when the trigger condition is satisfied in the running process of the UE. The base station configures the trigger condition of reporting the current location information to the UE based on the resource situations of the base station. The base station appropriately reduces control plane signaling overheads and power consumption of the UE on the premise of ensuring the location accuracy by controlling the number of reports and reporting frequency of the UE based on the trigger condition, thereby achieving the objective of improving the overall utilization of radio resources and reducing power consumption of the UE.

Embodiment II

In this embodiment of the present disclosure, the base station configures a trigger condition to the UE based on its own resource situation, and the base station configures different trigger conditions to the UE based on different resource situations of the base station. The UE receives the trigger condition configured by the base station, then determines the location of the UE in real time based on the trigger condition, and reports the determining result to the base station to supports the V2V transmission.

Figure 2:
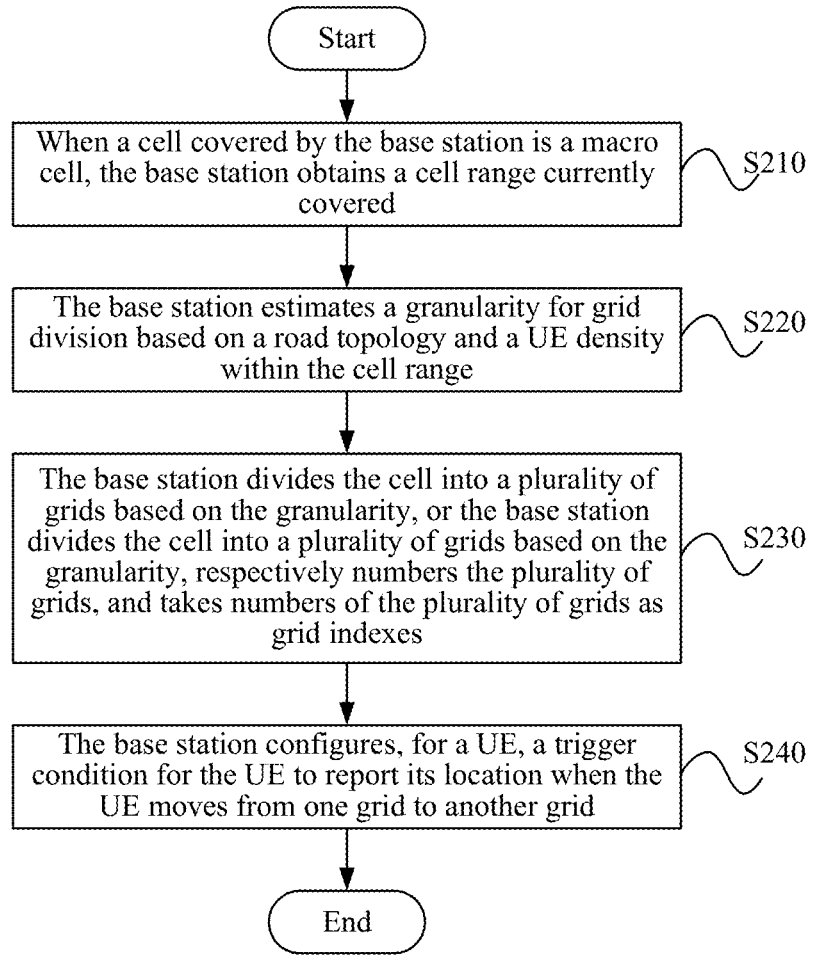
FIG. 2 illustrates a schematic flowchart of configuring a trigger condition by a base station for a user equipment (UE) based on resource situations according to Embodiment II of the present disclosure.

FIG. 2 illustrates a schematic flowchart of configuring a trigger condition by a base station for a UE based on the resource situation according to Embodiment II of the present disclosure, which includes the following steps.

In S210, when a cell covered by the base station is a macro cell, the base station obtains a range of the macro cell currently covered.

In S220, the base station estimates a granularity for grid division based on a road topology and a UE density within the range of the macro cell.

Figure 3:
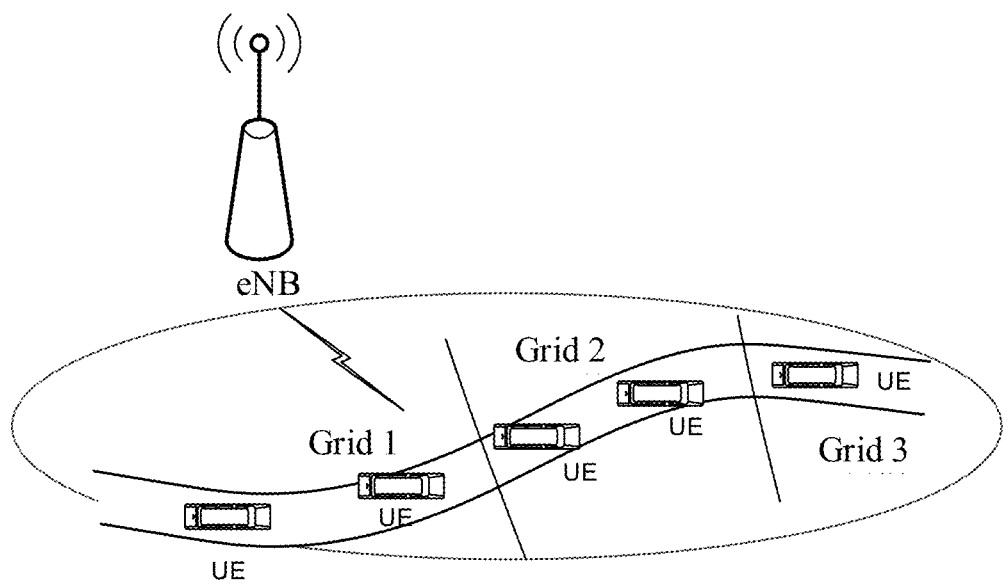
FIG. 3 illustrates a schematic diagram of a cell covered by the base station after grid division according to Embodiment II of the present disclosure.

In S210 and S220, the cell covered by the base station is a macro cell. The granularity for dividing the macro cell covered by the base station into grids depends on the UE density and road topology within the range of the current base station for V2X services. As shown in FIG. 3, the UE of the V2X merely runs in a strip-shaped area covered by the road, so in an alternative embodiment, it just needs to consider the strip-shaped area when the macro cell covered by the base station is divided into grids. As shown in FIG. 3, the macro cell covered by the base station eNB may be divided into three grids: grid 1, grid 2, and grid 3. The UE runs on the road within the three grids. It is to be noted that FIG. 3 merely illustrates an exemplary road topology, but the present disclosure is not limited thereto.

Figure 4:
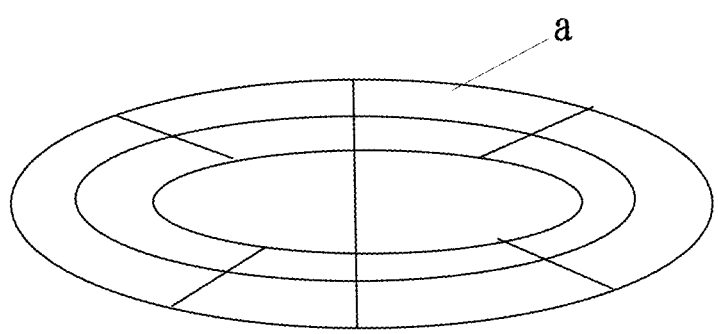
FIG. 4 illustrates another schematic diagram of dividing the cell covered by the base station into a plurality of grids according to Embodiment II of the present disclosure.

As shown in FIG. 4, which is a schematic diagram of dividing a cell into a plurality of grids, each small area divided in FIG. 4 is a grid a.

It is to be noted that description of grids in this embodiment of the present disclosure does not affect the RRC specification, which may be implemented in a network application layer by using an extensible markup language (XML). However, the description of grids in the present disclosure is not limited to the above description.

In S230, the base station divides the cell into a plurality of grids based on the granularity, or divides the cell into a plurality of grids based on the granularity, numbers the grids, and takes the numbers of the plurality of grids as grid indexes.

In S240, the base station configures, for the UE, the trigger condition of triggering a location report when the UE moves from one grid to another grid.

In this embodiment of the present disclosure, alternatively, the UE downloads grid configuration information of the macro cell after the UE enters the macro cell and gets into a connected state.

When the UE enters the macro cell, obtaining grid division information by the UE does not need to base on transmission of SIB (system information block) or RRC (radio resource control). The UE may download the grid division information (namely the grid information of the macro cell which the UE enters currently) when the UE gets into the connected state.

In this embodiment of the present disclosure, alternatively, the UE positions in real time to determine whether the UE moves from one grid to another grid. When the UE determines that that the UE has moved from one grid to another grid, the trigger condition is satisfied, and the UE reports the current location information to the base station via a radio resource control (RRC) layer when the grid configuration information does not include the grid index, or reports the grid index of the grid where the UE currently is located to the base station via a media access control (MAC) layer when the grid configuration information includes the grid index. That is, when reporting the current location information, the UE may upload the grid index of the grid where the UE is located via the MAC layer, thereby greatly reducing the limitation on the number of bits and reducing the size of an RRC message, and the UE may make a faster scheduling by using an MAC message assistance, and increase the overall utilization of the radio resources.

In this embodiment of the present disclosure, the base station divides the covered cell into grids based on the size of the cell currently covered by the base station and configures, for the UE, the grid information serving as a trigger condition. The trigger condition is as below: the UE does not need to report the current location information to the base station when the UE moves in a specific grid or a grid. The UE reports the current location information of the UE to the base station when the UE moves from one grid to another grid. The base station configures the trigger condition for the UE, and the UE reports the current location information of the UE to the base station based on the trigger condition when the UE moves from one grid to another grid.

Based on its own resource situation, the base station configures the trigger condition for the UE. In the running process, the UE reports its current location information to the base station based on the trigger condition if the mobility situation satisfies the trigger condition. Based on its own resource situations, the base station configures, for the UE, the trigger condition of reporting the current location information of the UE, and the base station appropriately reduces control plane signaling overheads and the power consumption of the UE on the premise of ensuring the location accuracy of the UE by controlling the number of reports and reporting frequency of the UE based on the trigger condition, thereby achieving the objective of improving the overall utilization of radio resources and reducing the power consumption of the UE.

In this embodiment of the present disclosure, alternatively, configuring, by the base station, the trigger condition for the UE based on the resource situation may further include:

when a cell covered by the base station is a macro cell and the macro cell is not divided into grids the trigger condition configured by the base station for the UE based on the resource situation is triggering a location report based on a preset maximum report frequency or a preset minimum report frequency when a velocity of the UE changes.

In the trigger condition of reporting the UE's current location information which is configured by the base station for the UE, the report frequency of the UE is not limited, instead a maximum report frequency and a minimum report frequency is set as the trigger condition of reporting the current location information based on the velocity of the UE. That is, the trigger condition is as below: a location report is triggered based on the preset maximum report frequency or the preset minimum report frequency when the velocity of the UE changes.

For example, since the velocity of the UE may change, the UE reports its current location information to the base station at the maximum report frequency via the RRC layer when the velocity is adjusted to be a high velocity and a displacement state changes greatly. The UE does not need to frequently report its current location information to the base station when the velocity is adjusted to be a low velocity and the displacement state changes slightly. In this case, the UE reports its current location information to the base station at the minimum report frequency via the RRC layer. The minimum report frequency may be configured so as to avoid the base station not knowing that the location of the UE has been changed.

In this embodiment of the present disclosure, alternatively, the UE determines its own velocity in real time. When the velocity is adjusted to be the high velocity and the displacement state changes greatly, it is determined that the trigger condition is satisfied, and the UE reports its current location information to the base station at the preset maximum report frequency via the RRC layer.

When the velocity is adjusted to be the low velocity and the displacement state changes slightly, the trigger condition is also satisfied, and the UE reports the current location information of the UE to the base station at the preset minimum report frequency via the RRC layer.

In this embodiment of the present disclosure, the trigger condition configured by the base station for the UE is related to the velocity of the UE. In the running process of the UE, the UE reports the current location information to the base station when the trigger condition is satisfied. The base station appropriately reduces control plane signaling overheads and power consumption of the UE on the premise of ensuring the location accuracy by controlling the number of reports and reporting frequency of the UE based on the trigger condition, thereby achieving the objective of improving the overall utilization of radio resources and reducing power consumption of the UE.

In this embodiment of the present disclosure, alternatively, the process of configuring the trigger condition for the UE by the base station based on the resource situation may be implemented as follows.

When the cell covered by the base station is a macro cell and the macro cell is not divided into grids, the trigger condition configured by the base station for the UE based on the resource situation is that a differential between a location previously reported by the UE and a current location is greater than a preset threshold.

The trigger condition configured by the base station for the UE is that the location report is triggered based on a distance differential (location differential) between a location previously reported to the base station and a current location. That is, a location report is triggered when the trigger condition is that a differential between the location previously reported by the UE and the current location is greater than the preset threshold.

In this embodiment of the present disclosure, alternatively, the UE determines, based on a hysteresis mechanism within preset time, whether the differential between the location previously reported and the current location is greater than the preset threshold. The UE reports its current location information to the base station via the RRC after determining that the trigger condition is satisfied when the differential between the location previously reported and the current location is greater than the preset threshold.

In this embodiment of the present disclosure, the UE is triggered to make a location report when the differential between the location previously reported by the UE and the current location is greater than the preset threshold. The UE reports its current location to the base station based on the distance differential (location differential), and avoids excessively frequent reports based on the hysteresis mechanism. In the running process of the UE, the base station appropriately reduces control plane signaling overheads and power consumption of the UE on the premise of ensuring the location accuracy by controlling the number of reports and reporting frequency of the UE based on the trigger condition, thereby achieving the objective of improving the overall utilization of radio resources and reducing power consumption of the UE.

In this embodiment of the present disclosure, alternatively, when a cell covered by the base station is a small cell or the UE enters an area provided with a road side unit (RSU), the UE directly receives a scheduling of the base station or a scheduling of the RSU.

Alternatively, when a V2V communication based on Device-to-Device (D2D) is carried out between a UE currently running in the small cell or the RSU area and a UE running in another cell with larger range, if the location information is needed, the location information of the UE may be obtained by using the identity of the current small cell or the RSU. The UE in the connected state does not need to report its location information again because a Mobility Management Entity (MME) has maintained information of the currently serving cell.

It is to be noted that when the UE involved in this embodiment of the present disclosure can support positioning entirely based on the UE, for example, a GNSS (Global Navigation Satellite System) scheme, it may be easier to execute the technical solution (for example, to determine a displacement) disclosed by the embodiment of the present disclosure.

Embodiment III

Based on the method for processing control plane signaling in a V2V transmission mechanism disclosed by Embodiment I and Embodiment II of the present disclosure, Embodiment III of the present disclosure correspondingly discloses a system for processing control plane signaling in V2V transmission mechanism.

Figure 5:
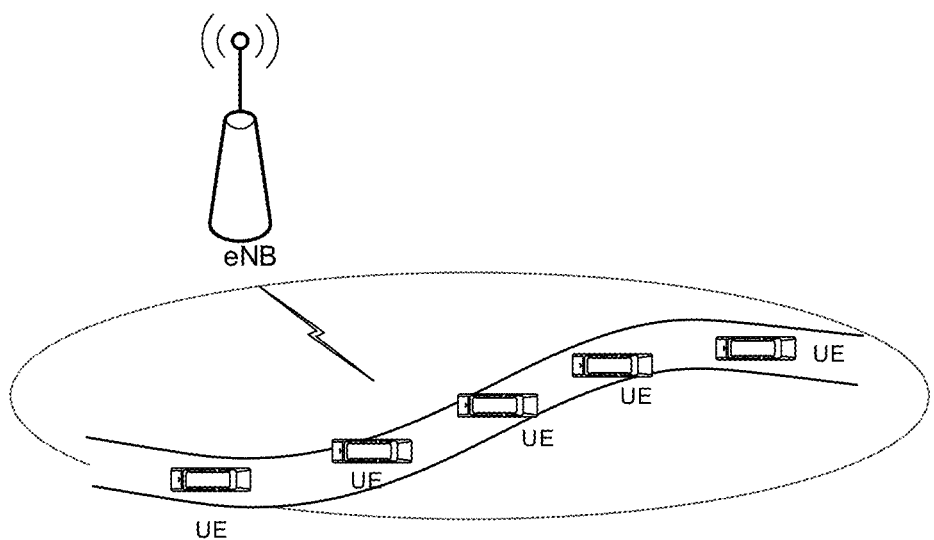
FIG. 5 illustrates an architecture diagram of a system for processing control plane signaling in a V2V transmission mechanism according to Embodiment III of the present disclosure.

As shown in FIG. 5, which illustrates an architecture diagram of the system for processing control plane signaling in a V2V transmission mechanism corresponding to Embodiment I and Embodiment II of the present disclosure. The system includes a base station eNB and a user equipment (UE).

The base station eNB is configured to configure a trigger condition for the UE based on a resource situation.

The UE is configured to receive the trigger condition, and report current location information to the base station based on the trigger condition when the trigger condition is satisfied.

In this technical solution disclosed in this embodiment of the present disclosure, alternatively, the base station eNB includes:

a first obtaining module, configured to, when a cell covered by the base station is a macro cell, obtain a range of a macro cell currently covered;

an estimating module, configured to estimate a granularity for grid division based on a road topology and a UE density within the range of the macro cell;

a dividing module, configured to divide the macro cell into a plurality of grids based on the granularity, or divide the macro cell into a plurality of grids based on the granularity and number the grids, and take numbers of the plurality of grids as grid indexes; and a first configuring module, configured to configure, for the UE, the trigger condition of triggering a location report when the UE moves from one grid to another grid.

The UE includes:

a downloading module, configured to download grid information of the macro cell after the UE enters the macro cell and gets into a connected state; and a first reporting module, configured to position in real time to determine whether the UE moves from one grid to another grid; determine that the trigger condition is satisfied when determining that the UE moves from one grid to another grid, and report the current location information to the base station via a radio resource control (RRC) layer when the grid configuration information does not include the grid index, or report the grid index of the grid where the UE currently is to the base station via a media access control (MAC) layer when the grid configuration information includes the grid index.

In this technical solution disclosed in this embodiment of the present disclosure, alternatively, the base station eNB includes:

a second configuring module, configured to configure, for the UE when the cell covered by the base station is a macro cell and the macro cell is not divided into grids, the trigger condition of triggering a location report based on a preset maximum report frequency or a preset minimum report frequency when a velocity of the UE changes.

The UE includes:

a velocity determining module, configured to determine a velocity of the UE in real time; and a second reporting module, configured to determine that a second trigger condition is satisfied when the velocity is adjusted to be a high velocity and a displacement state changes greatly and report the current location information to the base station at the preset maximum report frequency via the RRC layer, or determine that the trigger condition is satisfied when the velocity is adjusted to be a low velocity and the displacement state changes slightly and report the current location information to the base station at the preset minimum report frequency via the RRC layer.

In this technical solution disclosed in this embodiment of the present disclosure, alternatively, the base station eNB includes:

a third configuring module, configured to configure, for the UE when the cell covered by the base station is a macro cell and the macro cell is not divided into grids, the trigger condition of triggering a location report when a differential between a location previously reported by the UE and a current location is greater than a preset threshold.

The UE includes:

a third reporting module, configured to determine, based on a hysteresis mechanism and within a preset time, whether the differential between the location previously reported and the current location is greater than the preset threshold, and determine that the trigger condition is satisfied when the differential between the location previously reported and the current location is greater than the preset threshold and report the current location information to the base station via the RRC layer.

In this embodiment of the present disclosure, the base station configures the trigger condition for the UE to report its current location information. In the running process of the UE, the UE reports its current location information to the base station when the mobility situation of the UE satisfies the trigger condition. The base station appropriately reduces control plane signaling overheads and power consumption of the UE on the premise of ensuring the location accuracy by controlling the number of reports and reporting frequency of the UE based on the trigger condition, thereby achieving the objective of improving the overall utilization of radio resources and reducing power consumption of the UE. That is, the technical solution for reducing the control plane signaling overheads disclosed by this embodiment of the present disclosure can reduce the signaling overheads caused by reporting the UE location information to the base station by the UE on the premise of satisfying scheduling needs, so as to better support the V2V transmission based on the PC5.

Embodiment IV

Based on the technical solution disclosed by Embodiment I to Embodiment III of the present disclosure, Embodiment IV of the present disclosure further provides a non-transitory computer readable storage medium, which is arranged at a base station and stores computer-executable instructions. The computer-executable instructions may execute any one of the above methods for processing control plane signaling in a V2V transmission mechanism.

Embodiment V

Based on the technical solution disclosed by Embodiment I to Embodiment IV of the present disclosure, Embodiment V of the present disclosure further provides a non-transitory computer readable storage medium, which is arranged at a user equipment (UE) and stores computer-executable instructions. The computer-executable instructions may execute any one of the above methods for processing control plane signaling in a V2V transmission mechanism.

Embodiment VI

Based on the technical solution disclosed by Embodiment I to Embodiment V of the present disclosure, Embodiment VI of the present disclosure further provides a schematic diagram of a hardware structure of a user equipment.

Figure 6:
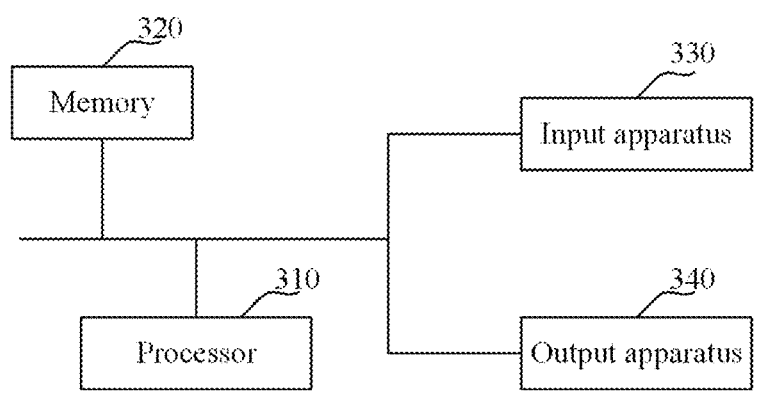
FIG. 6 illustrates a schematic diagram of a hardware structure of a user equipment according to Embodiment VI of the present disclosure.

As shown in FIG. 6, the user equipment includes:

one or more processors 310, in FIG. 6 one processor 310 being taken as an example; and a memory 320.

The user equipment may further include an input apparatus 330 and an output apparatus 340.

The processor 310, the memory 320, the input apparatus 330 and the output apparatus 340 in the user equipment may be connected by way of a bus or in other ways, in FIG. 6 connecting by way of a bus is taken as an example.

As a non-transitory computer readable storage medium, the memory 320 may be configured to store software programs, computer executable programs and modules such as program instructions/modules (for example, the downloading module and the first reporting module) corresponding to the equipment in Embodiment III of the present disclosure. The processor 310 may execute various function applications and data processing of a server, namely implement the method for control plane signaling processing in a V2V transmission mechanism in the foregoing method embodiments by running the software programs, instructions and modules stored in the memory 320.

The memory 320 may include a program storage area and a data storage area. The program storage area may store an operating system, application programs required for at least one function; and the data storage area may store data created according to the use of a terminal device. Moreover, the memory 320 may include a high speed random access memory, or may further include a non-volatile memory, for example, at least one magnetic disk storage device, a flash memory, or other non-volatile solid-state storage devices. In some embodiments, the memory 320 may optionally include some memories disposed remotely relative to the processor 310, and these remote memories may be connected to a terminal device via the network. Instances of the foregoing network includes but is not limited to the Internet, the Intranet, a local area network (LAN), a mobile communication network and a combination thereof.

The input apparatus 330 may be configured to receive inputted numerical or character information to generate key signal inputs related to user settings and function control a terminal. The output apparatus 340 may include a display device such as a display screen, etc.

The one or more modules are stored in the memory 320, and when they are executed by the one or more processors 310, the method for control plane signaling processing in a V2V transmission mechanism configured in a user equipment according to the foregoing method embodiments is executed.

Embodiment VII

Based on the technical solution disclosed by Embodiment I to Embodiment VI of the present disclosure, Embodiment VII of the present disclosure further provides a schematic diagram of a hardware structure of a base station.

Figure 7:
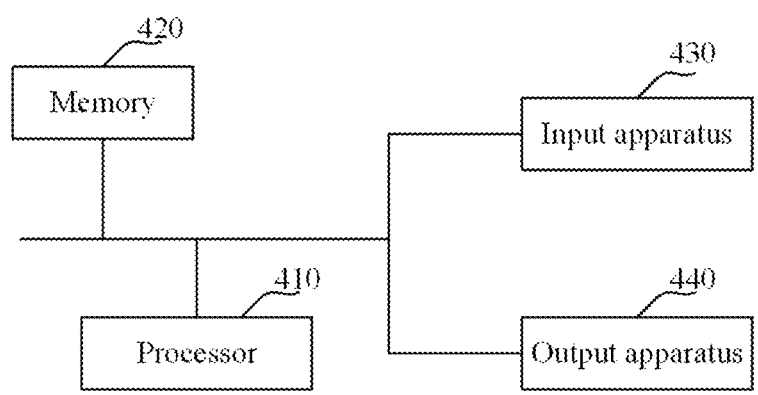
FIG. 7 illustrates a schematic diagram of a hardware structure of a base station according to Embodiment VII of the present disclosure.

As shown in FIG. 7, the base station includes:

one or more processors 410, in FIG. 7 one processor 410 being taken as an example; and a memory 420.

The base station may further include an input apparatus 430 and an output apparatus 440.

The processor 410, the memory 420, the input apparatus 430 and the output apparatus 440 in the equipment may be connected by way of a bus or in other ways, in FIG. 7 connecting by way of a bus is taken as an example.

As a non-transitory computer readable storage medium, the memory 420 may be configured to store software programs, computer executable programs and modules such as program instructions/modules (for example, the first obtaining module, the estimating module, the dividing module, and the first configuring module) corresponding to the base station in Embodiment III of the present disclosure. The processor 410 may execute various function applications and data processing of a server, namely implement the method for control plane signaling processing in a V2V transmission mechanism in the foregoing method embodiments by running the software programs, instructions and modules stored in the memory 420.

The memory 420 may include a program storage area and a data storage area, where the program storage area may store an operating system, application programs required for at least one function; and the data storage area may store data created according to the use of a terminal device. Moreover, the memory 420 may include a high speed random access memory, or may further include a non-volatile memory, for example, at least one magnetic disk storage device, a flash memory, or other non-volatile solid-state storage devices. In some embodiments, the memory 420 may optionally include some memories disposed remotely relative to the processor 410, and these remote memories may be connected to a terminal device via the network. Instances of the foregoing network includes but is not limited to the Internet, the Intranet, a local area network (LAN), a mobile communication network and a combination thereof.

The input apparatus 430 may be configured to receive inputted numerical or character information to generate key signal inputs related to user settings and function control a terminal. The output apparatus 440 may include a display device such as a display screen, etc.

The one or more modules are stored in the memory 420, and when they are executed by the one or more processors 410, the method for control plane signaling processing in a V2V transmission mechanism configured in the base station according to the foregoing method embodiments is executed.

The technical solution of the present disclosure is described above with reference to the accompanying drawings. According to the technical solution for processing control plane signaling in a V2V transmission mechanism proposed by the present disclosure, the base station may configure a trigger condition for the UE for reporting its current location information based on resource situations of the base station on the premise of satisfying scheduling needs. The base station may adjust related parameters in the trigger condition based on control plane transmission resource situations to control a total quantity of the report resources and coordinate the V2X services and other services. The base station appropriately reduces control plane signaling overheads and power consumption of the UE on the premise of ensuring the location accuracy by controlling the number of reports and reporting frequency of the UE based on the trigger condition, thereby achieving the objective of improving the overall utilization of radio resources and reducing power consumption of the UE, and better supporting the V2V transmission based on the PC5.

The above are merely a part of the embodiments of the present disclosure and are not intended to limit the present disclosure. To those skilled in the art, the present disclosure may have various modifications and changes. All modifications, equivalent substitutions and improvements made within the spirit and principle of the present application shall fall within the protection scope of the present disclosure.

INDUSTRIAL APPLICABILITY

According to the technical solutions for processing control plane signaling in a V2V transmission mechanism proposed by the embodiments of the present disclosure, the base station configures a trigger condition for the UE for reporting its current location information to the base station based on resource situations of the base station on the premise of satisfying scheduling needs, thereby appropriately reducing control plane signaling overheads and power consumption of the UE while ensuring the location accuracy of the UE by controlling the number of reports and reporting frequency of the UE based on the trigger condition.

What is claimed is:

1. A method for processing control plane signaling in a Vehicle to Vehicle (V2V) transmission mechanism, comprising:

configuring, by a base station and based on a resource situation, a trigger condition for a user equipment (UE);

receiving, by the UE, the trigger condition, and reporting, by the UE, current location information to the base station based on the trigger condition when the trigger condition is satisfied;

obtaining, by the base station when a cell covered by the base station is a macro cell, a range of the macro cell currently covered;

estimating a granularity for grid division by the base station based on a road topology and a UE density within the range of the macro cell; and dividing, by the base station based on the granularity, the macro cell into a plurality of grids; or dividing the macro cell into a plurality of grids based on the granularity, respectively numbering the plurality of grids, and taking numbers of the plurality of grids as grid indexes;

wherein the trigger condition configured by the base station for the UE based on the resource situation is triggering a location report when the UE moves from one grid to another grid.

2. The method according to claim 1, further comprising:

downloading, by the UE, grid configuration information of the macro cell after the UE enters the macro cell and gets into a connected state.

3. The method according to claim 2, wherein the reporting current location information to the base station based on the trigger condition when the trigger condition is satisfied comprises:

positioning in real time by the UE to determine whether the UE moves from one grid to another grid;

when it is determined that the UE moves from one grid to another grid, determining that the trigger condition is satisfied; and reporting the current location information to the base station via a radio resource control (RRC) layer by the UE when the grid configuration information does not include the grid index, or reporting the grid index of the grid where the UE currently is located to the base station via a media access control (MAC) layer by the UE when the grid configuration information includes the grid index.

4. The method according to claim 1, further comprising: triggering a location report based on a preset maximum report frequency or a preset minimum report frequency when a cell covered by the base station is a macro cell and the macro cell is not divided into grids, wherein the trigger condition configured by the base station for the UE based on the resource situation is that a velocity of the UE changes.

5. The method according to claim 4, wherein the reporting the current location information to the base station based on the trigger condition when the trigger condition is satisfied comprises:
   determining, by the UE in real time, the velocity of the UE;
   determining that the trigger condition is satisfied and reporting the current location information to the base station at the preset maximum report frequency via a radio resource control (RRC) layer upon determining that the velocity of the UE is adjusted to be a high velocity and a displacement state changes greatly; and
   determining that the trigger condition is satisfied and reporting the current location information to the base station at the preset minimum report frequency via the RRC layer upon determining that the velocity is adjusted to be a low velocity and the displacement state changes slightly.

6. The method according to claim 1, wherein
   when a cell covered by the base station is a macro cell and the macro cell is not divided into grids, the trigger condition configured by the base station for the UE based on the resource situation is triggering a location report when a differential between a location previously reported by the UE and a current location is greater than a preset threshold.

7. The method according to claim 6, wherein the reporting the current location information to the base station based on the trigger condition when the trigger condition is satisfied comprises:
   when the UE determines, based on a hysteresis mechanism and within a preset time, that the differential between the location previously reported and the current location is greater than the preset threshold, determining that the trigger condition is satisfied and reporting the current location information to the base station via a radio resource control (RRC) layer.

8. The method according to claim 1, further comprising:
   when a cell covered by the base station is a small cell, directly receiving, by the UE, a scheduling of the base station, or
   when the UE enters a region controlled by a road side unit (RSU), directly receiving, by the UE, a scheduling of the RSU.

9. A system for processing control plane signaling in a Vehicle to Vehicle (V2V) transmission mechanism, comprising a base station and a user equipment (UE);
   the base station being configured to configure a trigger condition for the UE based on a resource situation; and
   the UE being configured to receive the trigger condition, and report current location information to the base station based on the trigger condition when the trigger condition is satisfied;
   wherein the base station is further configured to:
   when a cell covered by the base station is a macro cell, obtain a range of the macro cell currently covered;
   estimate a granularity for grid division based on a road topology and a UE density within the range of macro cell;
   divide the macro cell into a plurality of grids based on the granularity, or divide the macro cell into a plurality of grids based on the granularity, respectively number the plurality of grids, and take numbers of the plurality of grids as grid indexes; and
   configure, for the UE, the trigger condition of triggering a location report when the UE moves from one grid to another grid,
   the UE is further configured to:
   download grid configuration information of the macro cell after the UE enters the macro cell and gets into a connected state;
   position in real time;
   determine that the trigger condition is satisfied when determining that the UE moves from one grid to another grid; and
   report the current location information to the base station via a radio resource control (RRC) layer when the grid configuration information does not include the grid index, or report the grid index of the grid where the UE currently is located to the base station via a media access control (MAC) layer when the grid configuration information includes the grid index.

10. The system according to claim 9, wherein
   the base station is further configured to:
   configure, for the UE when a cell covered by the base station is a macro cell and the macro cell is not divided into grids, the trigger condition of triggering a location report based on a preset maximum report frequency or a preset minimum report frequency when a velocity of the UE changes; and
   the UE is further configured to:
   determine a velocity of the UE in real time; and
   report the current location information to the base station at the preset maximum report frequency via a RRC layer after determining that the trigger condition is satisfied when the velocity is adjusted to be a high velocity and a displacement state changes greatly, or report the current location information to the base station at the preset minimum report frequency via the RRC layer after determining that the trigger condition is satisfied when the velocity is adjusted to be a low velocity and the displacement state changes slightly.

11. The system according to claim 9, wherein
   the base station is further configured to configure, for the UE when a cell covered by the base station is a macro cell and the macro cell is not divided into grids, the trigger condition of triggering a location report when a differential between a location previously reported by the UE and a current location is greater than a preset threshold; and
   and wherein the UE is further configured to report the current location information to the base station via a radio resource control (RRC) layer after determining that the trigger condition is satisfied when the UE determines, based on a hysteresis mechanism within preset time, that the differential between the location previously reported and the current location is greater than the preset threshold.

12. A non-transitory computer readable storage medium, storing computer-executable instructions, wherein the computer-executable instructions are used for executing a method for processing control plane signaling in a V2V transmission mechanism, wherein the method for processing control plane signaling in a V2V transmission mechanism further comprising:

configuring, by a base station and based on a resource situation, a trigger condition for a user equipment (UE); and receiving, by the UE, the trigger condition, and reporting, by the UE, current location information to the base station based on the trigger condition when the trigger condition is satisfied;

obtaining, by the base station when a cell covered by the base station is a macro cell, a range of the macro cell currently covered;

estimating a granularity for grid division by the base station based on a road topology and a UE density within the range of the macro cell; and dividing, by the base station based on the granularity, the macro cell into a plurality of grids; or dividing the macro cell into a plurality of grids based on the granularity, respectively numbering the plurality of grids, and taking numbers of the plurality of grids as grid indexes;

wherein the trigger condition configured by the base station for the UE based on the resource situation is triggering a location report when the UE moves from one grid to another grid.

13. The non-transitory computer readable storage medium according to claim 12, wherein the method for processing control plane signaling in a V2V transmission mechanism further comprises:

downloading, by the UE, grid configuration information of the macro cell after the UE enters the macro cell and gets into a connected state.

14. The non-transitory computer readable storage medium according to claim 13, wherein the reporting current location information to the base station based on the trigger condition when the trigger condition is satisfied comprises:

positioning in real time by the UE to determine whether the UE moves from one grid to another grid;

when it is determined that the UE moves from one grid to another grid, determining that the trigger condition is satisfied; and reporting the current location information to the base station via a radio resource control (RRC) layer by the UE when the grid configuration information does not include the grid index, or reporting the grid index of the grid where the UE currently is located to the base station via a media access control (MAC) layer by the UE when the grid configuration information includes the grid index.

15. The non-transitory computer readable storage medium according to claim 12, wherein the method for processing control plane signaling in a V2V transmission mechanism further comprises:

triggering a location report based on a preset maximum report frequency or a preset minimum report frequency when a cell covered by the base station is a macro cell and the macro cell is not divided into grids, wherein the trigger condition configured by the base station for the UE based on the resource situation is that a velocity of the UE changes.

16. The non-transitory computer readable storage medium according to claim 15, wherein the reporting the current location information to the base station based on the trigger condition when the trigger condition is satisfied comprises:

determining, by the UE in real time, the velocity of the UE;

determining that the trigger condition is satisfied and reporting the current location information to the base station at the preset maximum report frequency via a radio resource control (RRC) layer upon determining that the velocity of the UE is adjusted to be a high velocity and a displacement state changes greatly; and determining that the trigger condition is satisfied and reporting the current location information to the base station at the preset minimum report frequency via the RRC layer upon determining that the velocity is adjusted to be a low velocity and the displacement state changes slightly.

17. The non-transitory computer readable storage medium according to claim 15, wherein when a cell covered by the base station is a macro cell and the macro cell is not divided into grids, the trigger condition configured by the base station for the UE based on the resource situation is triggering a location report when a differential between a location previously reported by the UE and a current location is greater than a preset threshold.

* * * * *